US012776143B2

(12) United States Patent
Yadav et al.

(10) Patent No.: US 12,776,143 B2
(45) Date of Patent: Oct. 27, 2026

(54) ALLOCATION BETWEEN RESOURCES USING PREDICTION SYSTEM

(71) Applicant: U.S. Bank, Minneapolis, MN (US)

(72) Inventors: Anand K. Yadav, Lakeville, MN (US); Ahmed Mohammed Abdelrahman Mohammed, Dallas, TX (US); Samuel Ayalew Assefa, Boston, MA (US); Andrew G. Crow, Arlington, TX (US)

(73) Assignee: U.S. Bank, Minneapolis, MN (US)

( * ) Notice: Subject to any disclaimer, the term of this patent is extended or adjusted under 35 U.S.C. 154(b) by 306 days.

(21) Appl. No.: 18/532,147

(22) Filed: Dec. 7, 2023

(65) Prior Publication Data

US 2025/0191375 A1 Jun. 12, 2025

(51) Int. Cl.

*G06V 20/40* (2022.01)
*G06Q 30/015* (2023.01)
*G06V 20/52* (2022.01)
*G06V 20/54* (2022.01)

(52) U.S. Cl.

CPC ........... *G06V 20/53* (2022.01); *G06Q 30/015* (2023.01); *G06V 20/41* (2022.01); *G06V 20/54* (2022.01)

(58) Field of Classification Search

CPC ......... G06V 20/53; G06V 20/54; G06V 20/52
See application file for complete search history.

(56) References Cited

U.S. PATENT DOCUMENTS

| | | | | |
|---|---|---|---|---|
| 10,902,441 | B2 | 1/2021 | Klima et al. | |
| 2019/0114703 | A1* | 4/2019 | Barnett | G06Q 20/3224 |
| 2019/0392222 | A1* | 12/2019 | Westmacott | G06V 20/49 |
| 2023/0101514 | A1 | 3/2023 | Lloyd et al. | |
| 2024/0338946 | A1* | 10/2024 | Khan | G06V 10/26 |

FOREIGN PATENT DOCUMENTS

| | | | | |
|---|---|---|---|---|
| AU | 2020202221 A1 | | 10/2020 | |
| CN | 116701756 A | * | 9/2023 | G06F 16/9535 |
| WO | WO-2022091196 A1 | * | 5/2022 | G06N 20/00 |

* cited by examiner

*Primary Examiner* — Oneal R Mistry
*Assistant Examiner* — Nhut Huy Pham
(74) *Attorney, Agent, or Firm* — Merchant & Gould P.C.

(57) ABSTRACT

Systems and methods to convert one or more objects of interest from a respective image of each of at least two contained spaces into respective one or more numerical counts indicative of a number of the one or more objects of interest in the at least two contained spaces within a period of time. A prediction is generated of a future number of the one or more objects of interest in the at least two contained spaces within a future period of time after the period of time, and a recommendation is recommended to a prospective user one of the at least two contained spaces for the prospective user to select as a destination within the future period of time based on the prediction of the future number of one or more objects of interest in each of the at least two contained spaces.

35 Claims, 8 Drawing Sheets

| Time | Branch 1 | Branch 2 | Branch 3 | Recommendation |
|---|---|---|---|---|
| 9:30 a.m. | Red (busy) | Green | Red (busy) | Branch 2 |
| 10:15 a.m. | Green | Red (busy) | Green | Branch 1 or 3 |
| 11:00 a.m. | Red (busy) | Red (busy) | Red (busy) | Wait until later |

ALLOCATION BETWEEN RESOURCES USING PREDICTION SYSTEM

TECHNICAL FIELD

The present disclosure includes systems and methods for allocating among resources, such as systems and methods for using an artificial intelligence prediction system to allocate among contained spaces, for example by generating a recommendation to a prospective user of one of at least two resources associated with contained spaces for the prospective user to select as a destination within a future period of time based on a prediction of a future number of objects of interest in each of the at least two contained spaces.

BACKGROUND

Consumers may find it difficult to connect to vendor personnel in person and understand wait times at a vendor location. For example, banking consumers may find it difficult to connect to and meet with a banker in a physical bank branch in a suitable timeframe. When physical bank branches close or modify their hours, existing and new customers may have difficulty connecting to and meeting with a banker in physical branch within an acceptable time frame for the user. While appointment booking technology can be used to lessen these difficulties, some people may not want to be so constrained and may prefer walk-in service. Further, appointment booking system are often inefficient in part because of difficulties in algorithms for estimating allocating customers or resources among locations in view of current or predicted conditions. Thus, current technology is limited by inaccurate results and failure to be able to account for real world conditions. These drawbacks can lower efficiency and increase wastage of resources. Accordingly, a need exists for improved technology that provides more accurate output in a timely, efficient, and streamlined manner.

BRIEF SUMMARY

According to the subject matter of the present disclosure, a non-transitory computer readable medium having instructions that, when executed by one or more processors, cause the one or more processors to convert one or more objects of interest from a respective image of each of at least two contained spaces into respective one or more numerical counts indicative of a number of the one or more objects interest in the at least two contained spaces within a period of time. The instructions, when executed by one or more processors, cause the one or more processors to generate, via a time-series-based prediction model, a prediction of a future number of the one or more objects of interest in the at least two contained spaces within a future period of time after the period of time, and recommend as a recommendation to a prospective user one of the at least two contained spaces for the prospective user to select as a destination within the future period of time based on the prediction of the future number of the one or more objects of interest in each of the at least two contained spaces.

According to another embodiment, a system may include one or more processors and memory having instructions. When executed by the one or more processors, the instructions cause the one or more processors to convert one or more objects of interest from a respective image of each of at least two contained spaces into respective one or more numerical counts indicative of a number of the one or more objects of interest in the at least two contained spaces within a period of time. When executed by the one or more processors, the instructions further cause the one or more processors to generate, via a time-series-based prediction model, a prediction of a future number of the one or more objects of interest in the at least two contained spaces within a future period of time after the period of time, and recommend as a recommendation to a prospective user one of the at least two contained spaces for the prospective user to select as a destination within the future period of time based on the prediction of the future number of the one or more objects of interest in each of the at least two contained spaces.

According to yet another embodiment, a method may include converting one or more objects of interest from a respective image of each of at least two contained spaces into respective one or more numerical counts indicative of a number of the one or more objects of interest in the at least two contained spaces within a period of time. The method may further include generating, via a time-series-based prediction model, a prediction of a future number of the one or more objects of interest in the at least two contained spaces within a future period of time after the period of time, and recommending as a recommendation to a prospective user one of the at least two contained spaces for the prospective user to select as a destination within the future period of time based on the prediction of the future number of the one or more objects of interest in each of the at least two contained spaces.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals.

DETAILED DESCRIPTION

Some mapping services, like GOOGLE MAPS by GOOGLE, provide wait time and busy time estimations for businesses. While useful, such services are traditionally based on aggregating location history data from mobile devices, and so are dependent on users (and local regulations) permitting such aggregation and require a threshold number of users for a prediction. Such location history data is primarily limited to a count of individuals near a business, which can result in artificially inflated numbers when, for example, those individuals are not accessing or waiting for a resource of that business. Further, a general sense of how "busy" a location is, does not necessarily translate to a prediction of wait time. For example, one location may be busier than another, but also have sufficient staffing or capabilities to nonetheless have a lower wait time. Conversely, a location may not be busy at all because key resources are unavailable, and customers are directed elsewhere. Further, one resource of a location may be very busy while others at that same location may be completely open. So understanding how busy a location is does not necessarily translate into what the user truly wants to know (e.g., whether a particular resource at a location is available for use within a reasonable amount of time). In addition, even if such systems provided an easy comparison of how busy various locations are, such a system would not necessarily accurately allocate customers across locations, among other drawbacks. Thus, there is a need for improved technology for determining wait times and allocating users across resources.

Embodiments described herein are relevant to providing such improvements. For example, examples herein include an artificial intelligence (AI) tool trained, along with edge computing and Internet of Things (IoT) technologies, to allocate customers or resources among resources of nearby physical vendor locations based on the output of an AI algorithm. The output can be based on location services, to receive the service within a minimal wait time acceptable to a user. The AI algorithm may be used to monitor contained spaces at physical vendor locations (e.g., bank branches) via a count of objects of interest at the physical vendor location. In embodiments, the objects of interest may be individuals of interest, one or more vehicles, or combinations thereof. The AI algorithm may further be used to monitor a physical vendor location such as at drive-through locations by monitoring the number of cars and, accordingly, relaying the live data to determine how busy a particular drive-through lane is at a particular time.

Figure 1:
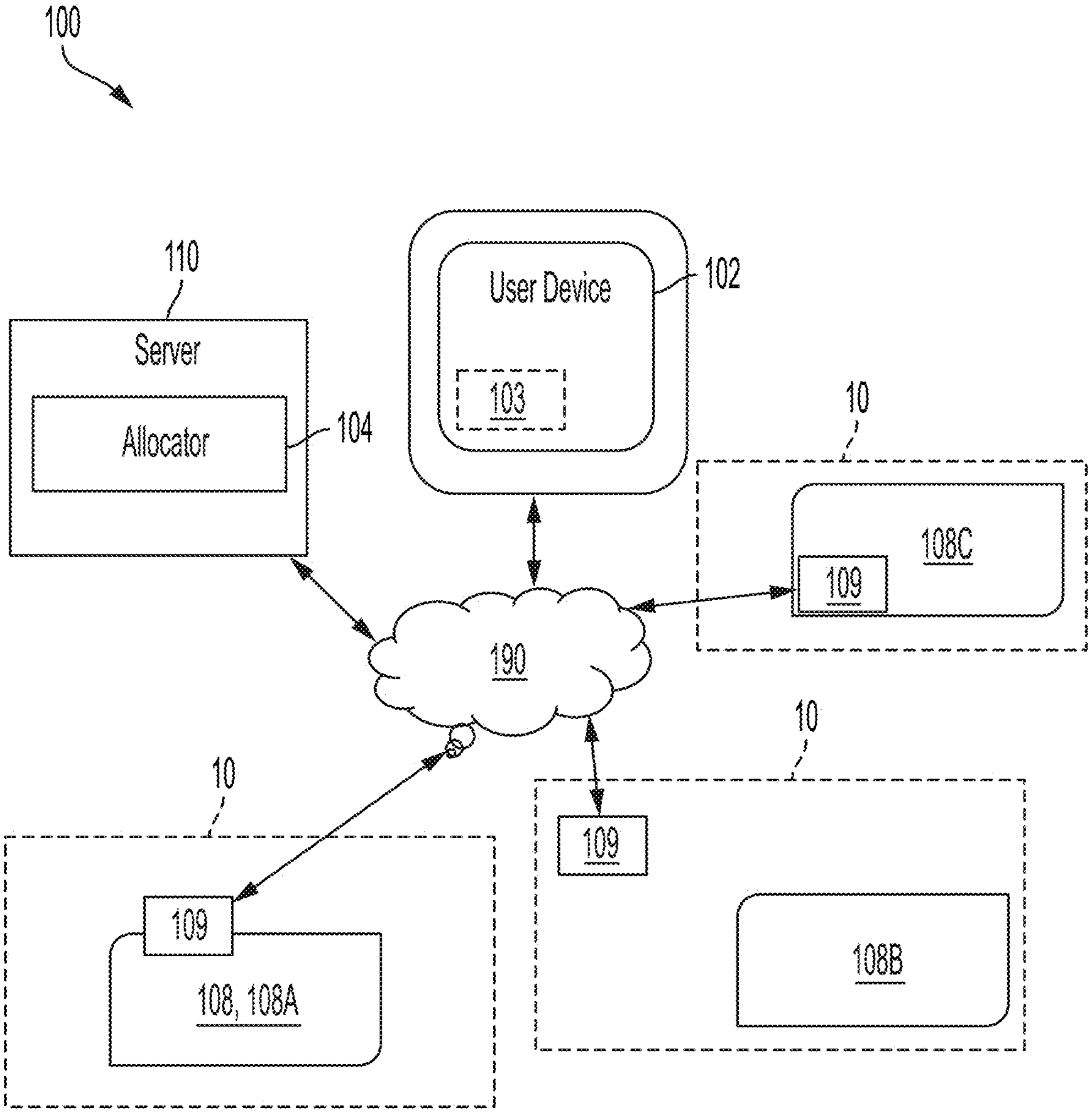
FIG. 1 schematically depicts an artificial intelligence (AI) prediction system, according to one or more embodiments described and illustrated herein.

Referring to FIG. 1, an artificial intelligence (AI) prediction system 100 includes three resources 108, which can be referred to individually as 108A, 108B, 108C, each being within respective contained spaces 10. The resources 108 can be directly or indirectly communicatively coupled with a network 190. The environment 100 can further include a user device 102 and a server 110, both of which are connected to the network 190.

A resource 108 can be an asset that satisfies a user need. For instance, the user may want to deposit a check at a physical location. Resources 108 that can satisfy that need can be a teller inside a bank branch, a teller accessible through a drive through, or a compatible ATM (Automated Teller Machine), other resources 108 or combinations thereof. Different resources 108 can have different levels of applicability to different tasks. For instance, an ATM may permit a user to withdraw a certain amount of money, but a teller may be needed to withdraw more than a threshold amount of money. In examples, the resources 108 can include or be within contained spaces 10.

Contained spaces 10 may each be an area of a physical location of or for a vendor (e.g., the entity providing the resource 108). While many examples herein are in the banking context, the resources need not be so limited. For instance, the resources may pertain to food (e.g., restaurants or grocery stores), a health service provider (e.g., doctors, hospitals, clinics, dentists, or pharmacies), shipping providers (e.g., post offices), parking spaces (e.g., on or off street parking), other kinds of resources, or combinations thereof. As a non-limiting example, the resources 108A-108C may correspond to resources provided by three separate bank branches of a bank of a user that are within a threshold proximity to the user (e.g., as determined by a location of a mobile device of a user). A single physical vendor location may have multiple different or overlapping contained spaces (e.g., a bank branch may be the vendor location and have separate contained spaces for teller windows, drive through lanes, bankers, and ATMs). Further, a vendor controlling the contained space 10 may be different from the vendor controlling the resource 108 (e.g., an ATM may be located within a shopping center). In some examples, the space is contained in the sense that it is a space that is physically bound (e.g., by walls, bollards, ropes, lanes, or other physical features that tend to separate the space from other spaces), logically bound (e.g., it is a space that is configured for a particular purpose whether or not it is physically distinguishable from other areas), sensor bound (e.g., it is an area about which usable sensor data can be obtained, such as by being usably within the frame of a camera).

The resources 108 may themselves be or include computing devices that can communicate with the network directly. For instance, the resource 108 may be an ATM coupled to a network or a computing device of a teller or banker. In addition or instead, the resource 108 may be monitored by a sensor 109.

The sensor 109 can be a device that obtains data about the resource 108 can communicates that information. Example sensors 109 include IoT devices, remote camera, or other device that obtains and communicates information about the resource 108 via the network 190. For instance, the teller or banker may be a resource that is not a directly coupled to the network, but the status of the teller can be inferred based on a computer of a teller may provide information about the current availability of the teller (e.g., by determining whether the computing device is currently being used to help a customer) or a camera monitoring the teller or a waiting area of customers waiting to be helped.

A network 190 may receive and transmit information from or about the resources 108. The information can be analyzed using an allocator 104.

The allocator 104 can be one or more applications running on the user device 102, sensors 109, server 110, other devices, or combinations thereof. In some examples, the allocator 104 can include an AI prediction model. The allocator 104 can be configured or trained to analyze received information and provide an output useful for allocating among the resources 108. For instance, the allocator 104 can receive information regarding current or future usage of relevant resources 108, the location of the user device 102, and other data, and then produce an output usable to facilitate the allocation of the customer or assets among the resources 108. The output can be used to reduce customer wait time and optimize usage or performance of the resource 108. The allocator 104 can include various features as described elsewhere herein.

The system 100 or a component thereof (e.g., the allocator 104) can include an image or video processing system. The image or video processing system can be implemented to include any of a variety of aspects described herein. A person of skill in the art with the benefit of disclosures herein can use any of a variety of known techniques to implement aspects described herein. For instance, a person of skill in the art may use image or video processing libraries, such as OPENCV by the OPENCV community, VLC media player by VIDEOLAN, and FFMPEG by the FFMPEG community to implement detection, segmentation, frame extraction, image processing, or frame modification. A person of skill in the art may use the Segment Anything Model by META AI to perform object detection or segmentation according to aspects described herein.

Figure 2:
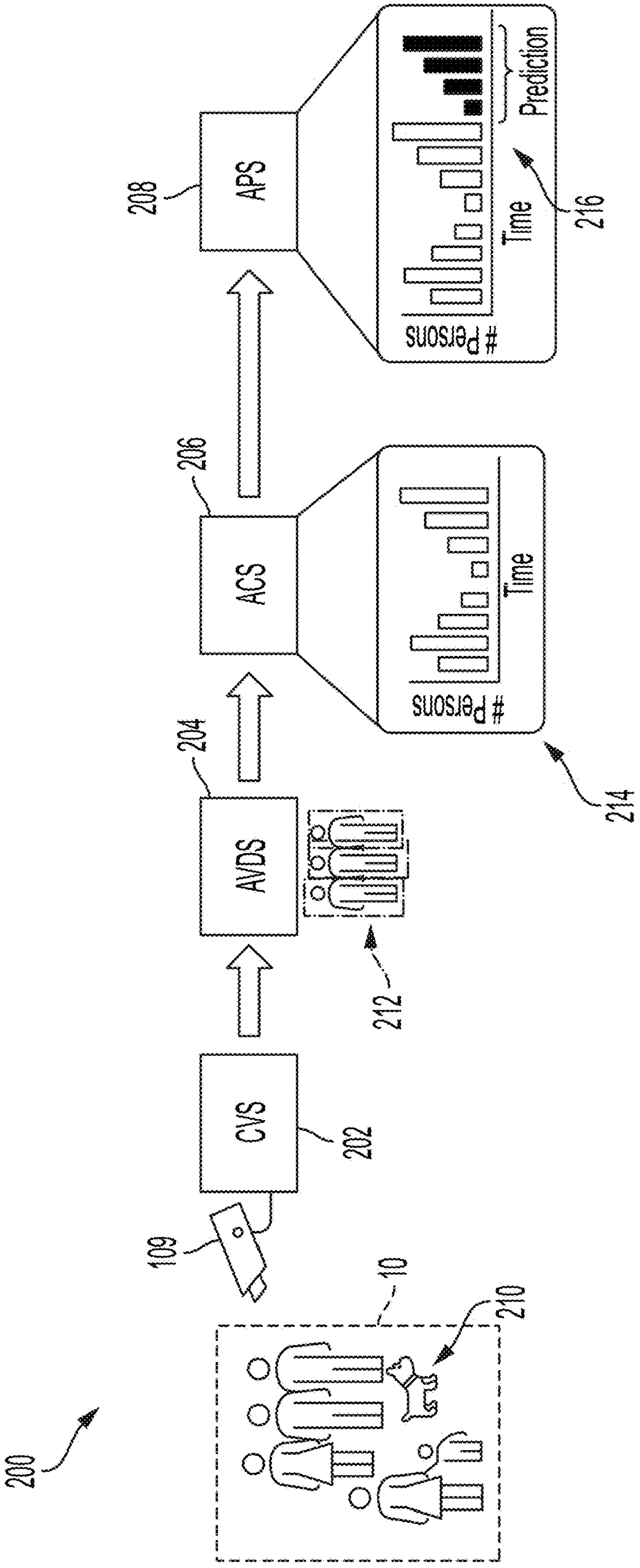
FIG. 2 schematically depicts an AI prediction system for use in an AI prediction system, such as that of FIG. 1, according to one or more embodiments described and illustrated herein.

FIG. 2 illustrates an example implementation of an AI prediction system 200, such as for use in the AI prediction system environment 100 of FIG. 1. The AI prediction system 200 (which may be an allocator system) is configured to transmit real time data from or about the resources 108 or the associated contained space 10, through the network 190, and to the one or more devices running the allocator 104 (e.g., the server 110, which can be on-premise or cloud based).

In an example, a user wants to search for nearby resources capable of cashing a check deposit and providing information about current rates for certificates of deposit. The user device 102 receives an actuation from the user and, in response, launches a bank application. The bank application presents a user interface that displays elements for receiving information about what the user wants to do (e.g., deposit a check, status inquiry, withdraw cash, apply for a loan, other financial options, or combinations thereof). The application receives over the user interface the options from the user (e.g., in this case cashing a check and inquiring about rates). In some examples, the application obtains user preferences regarding the resources. These preferences can be obtained from the user directly (e.g., over a user interface), loaded from memory, or predicted based on prior activities of a user. The application can provide a list of particular resource locations near the user (e.g., as determined based on the location of the user's mobile device 102 or determined via a web-based platform) connected to the network 190. The list can include a real-time feed of branch status for each bank in a predetermined proximity for the requested bank, action, or resource searched.

In embodiments, referring to FIG. 2, the AI prediction system 200 includes communicatively coupled sub-systems to receive and transmit data to the network 190. A computer vision sub-system ("CVS") 202 monitors the number of occupants 210 associated with a monitored resource 108, such as a number of users within a contained space 10 (e.g., a contained physical space) around the resource 108. The CVS 202 create an image such as a real-time video feed for an AI vision detection sub-system ("AVDS") 204. The CVS 202 may include a real-time image generating device, such as a camera, video capture card, or the like, to obtain the image (e.g., such a device or component may correspond to the sensor 109). The CVS 202 may also have control over the number of frames per second captured in real-time, which is a feature that can control a neural network input rate in the AVDS 204.

The AVDS 204 is configured to detect objects near the resource 108 (e.g., within the contained space 10 associated with the resource 108) based on the received image and distinguish objects of interest 212 from other captured objects. For example, humans are distinguished in one embodiment as an individual of interest 212 such as when the contained space 10 is a bank lobby of a bank branch. Vehicles that may be cars may be distinguished in another embodiment as an object of interest 212 or as containing or representing an individual of interest 212, such as when the contained space 10 is a drive-through location. The AVDS 204 may utilize a deep learning system, such as a convolutional neural network image recognition system to classify and label distinguished objects as objects of interest 212.

In embodiments, the AVDS 204 may use an image detection AI algorithm configured to identify objects of interest 212 within an image (e.g., a frame) and recognize to which classification category the object within the image belongs. The AVDS 204 may thus through image detection distinguish one object from another to determine how many distinct entities are present within the frame within a predetermined classification category (e.g., such as people or cars). Bounding regions (e.g., boxes) may be drawn around each separate object to identify them as objects of interest 212.

An AI model/engine of the AVDS 204 may be a deep learning neural network system trained on image recognition and including several neural layers with input neurons have a specific dimensionality. In some examples, the dimensionality is similar to the input image. In some examples, the input image is processed to fit the specific dimensionality. The deep learning neural network system may be a Convolutional Neural Network ("CNN") image recognition system that classifies the objects as objects of interest 212 and outputs a one-dimension labels vector of all the detected objects of interest 212. The output vector or another output of the AVDS 204 can be fed into an AI conversion subsystem ("ACS") 206.

The ACS 206 may communicatively interact with the AVDS 204 to convert the distinguished objects of interest 212 into counts. The ACS 206 may include a simple search algorithm that searches the labels vector for a specific classification (e.g., people or vehicles as a label) and singles out these labeled classes. The ACS 206, after filtering, can count the number of detected classes (e.g., person) and produce a two-dimension vector that consists of the count with a corresponding timestamp. Counts as described herein can refer to the number of people or other objects of interest 212 within the contained space 10, such as number of people in a lobby or a number of cars in a drive-through, at a specific time.

As a result, a time-series 214 of the number of occupants versus time can be created and fed into an AI prediction sub-system ("APS") 208. The APS 208 is configured to make future predictions regarding the number of counts within the physical contained space 10, such as the number of occupants within the physical vendor location or number of cars within the drive-through as a contained space 10. The APS 208 may use a time-series-based prediction model 103, such as long-short term memory ("LTSM"). LSTM is a neural network that takes the two-dimension vector produced by the ACS 206 to further produce a prediction 216 for how many objects of interest 212 will occupy a contained space 10 within a next period of time.

The APS 208 may be trained in a format in which a minimum requirement of training data is a series of pair of data points, the timestamp and the counts. While the data can be enriched by adding any relevant information, such as locations, the minimum requirement of the series of pair data points may be sufficient for the APS 208 to provide a recommendation as described herein.

The APS 208 can include any deep learning or machine learning prediction models, such as LSTM as described above. Training data can be collected or synthetically generated. The data can be collected from the ACS 206 in which the AVDS 204 will be deployed without the APS 208 data to allow for a collection of pairs for a period of time that depends on how much training data is needed as sufficient data to be collected to train the APS 208.

Once sufficient training data is collected, the APS 208 can be trained externally and then deployed to complete a chain of the sub-systems including the CVS 202, AVDS 204, ACS 206, and APS 208 as shown in FIG. 2. Through the training, the model structure of the APS 208 may be adjusted to deliver highly accurate predictions, such as through machine learning and/or controlling a number of input neurons or the number of the neural network hidden layers.

In embodiments, described in greater detail further below, use cases may be used to count distinguished objects and make a prediction of number of distinguished objects of interest 212 in a contained space 10 associated with a resource 108 across at least two separate resources 108 and associated spaces to make a recommendation to a user of which space to go to (if any). The recommendation may further report on an estimated wait time for the user and/or make provide an option to book an appointment at the location. Use cases may involve bank branches, drive-through of variety of vendors, restaurants, parking lots, health service locations (e.g., urgent care, dentists, pharmacies), or other vendors. An application on a platform, such as a mobile and/or web-based platform, may track use location as an input to determine a plurality of locations of contained spaces 10 within a certain distance to make a recommendation amongst those locations to the user based on the AI algorithm. The recommendation may further be based on an amount of time (e.g., inputting traffic) for the user to get to the recommended location. The analysis may provide a recommendation to the user of which one of the resources 108 has the minimum wait time, or may have it based on time to travel to the location as well.

Figure 3:
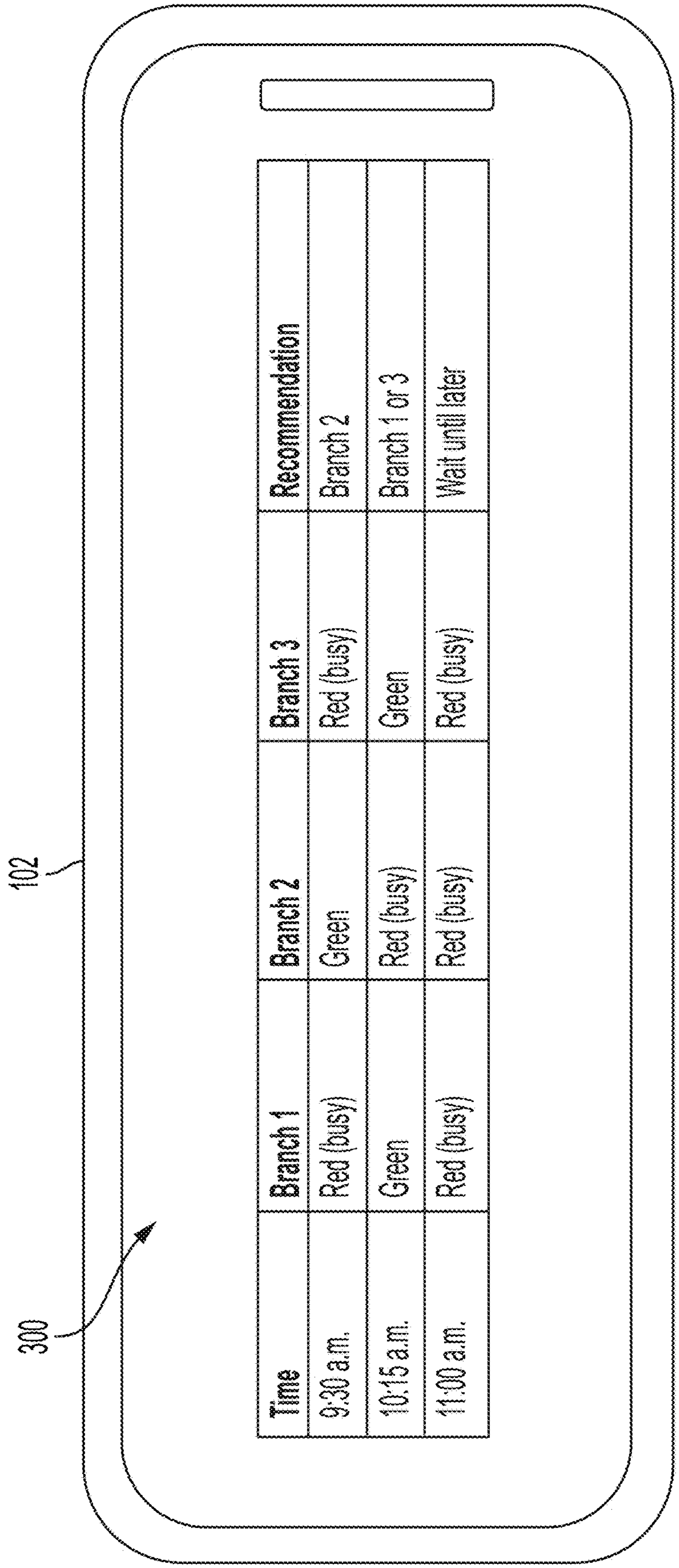
FIG. 3 schematically depicts a graphical user interface displaying an analysis output of an AI prediction system, such as that of FIG. 2, according to one or more embodiments described and illustrated herein.

Referring to FIG. 3, additionally or alternatively, the analysis may provide a report to the user for the user to determine which of the locations to select to travel to based on the report. The report may be presented on a graphical user interface (GUI) 300 displayed by the user mobile device 102 for the user. Based on this data, the user can choose to visit a contained space 10 of a plurality of presented contained space 10 options that is, for example, the bank branch that is least busy at certain time to efficiently route the user as a customer to branch in proximity to the user. If user will find all branches busy at a certain time based on the data, then then user may decide to wait and choose to check the status again later in the day to save the user a trip to branch when it is likely that the user will need to wait for a longer time unacceptable to the user.

In the embodiment of FIG. 3, the GUI 300 display an analysis of the AI prediction system 200 of FIG. 2 in which data from three contained spaces 10 as shown in FIG. 1, representative of three different bank branches of a bank within a predetermined distance to the user, were analyzed with a recommendation presented. At a first time of 9:30 a.m., the second branch is found to be acceptable within a predetermined threshold of predicted number of occupants and recommended to the user to go to rather than the first or third branches. At 10:15 a.m., either branch 1 or 3 is found to be acceptable. In embodiments, the AI prediction system 200 may further narrow down the recommendation based on factors such as a distance to the location, wait time, and/or other factors. At 11:00 a.m., all branches are found to be over the predetermined threshold of predicted number of occupants to be unacceptable, and the user is advised to wait until a later time to go to a branch.

In some examples, the above presentation of data to the user conserves processing resources and energy of the mobile device 102. For example, previously the user may needed to have switched among multiple applications to determine travel time and branch availability and still would not have achieved the same level of accuracy or understanding of the situation.

Figure 4:
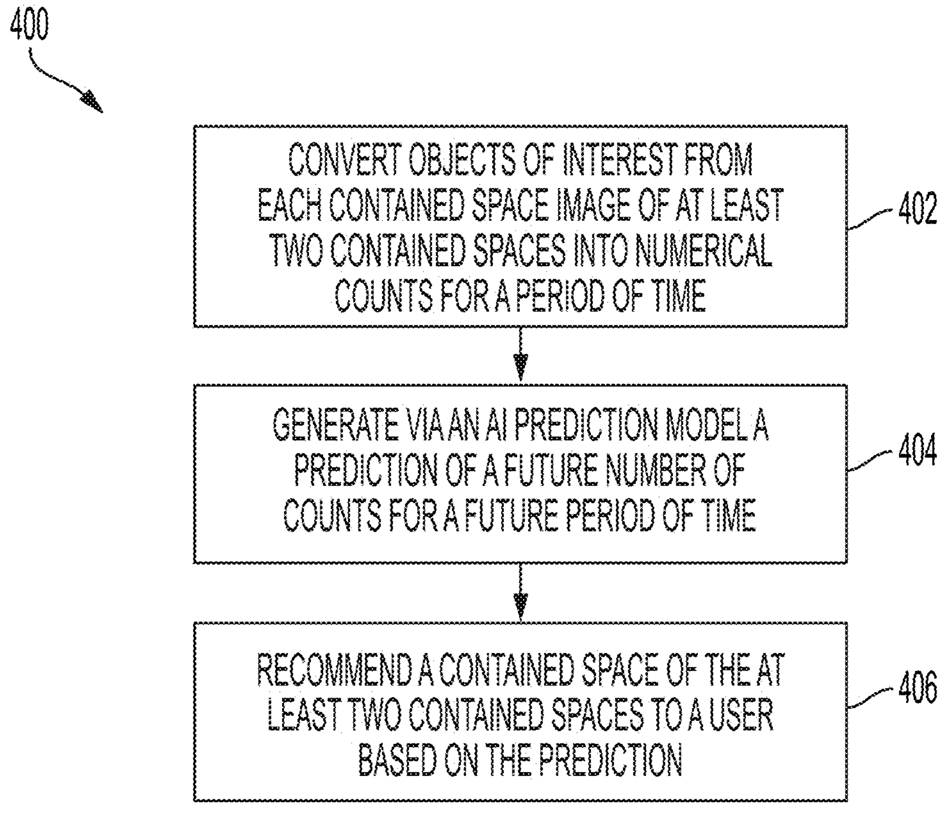
FIG. 4 schematically depicts a process of implementing an AI prediction system, such as that of FIG. 2, according to one or more embodiments described and illustrated herein.

Referring to FIG. 4, a process 400 of implementing the AI prediction system 200 of FIG. 2 is set forth. In block 402, via the ACS 206 of the AI prediction system 200, one or more objects of interest 212 from an image of each of at least two contained spaces 10 associated with resources 108 may be converted into respective one or more numerical counts indicative of a number of the one or more objects of interest 212 in the at least two contained spaces 10 within a period of time.

In an embodiment, the one or more objects of interest 212 are labeled as one or more humans. The at least two contained spaces 10 may each be a physical location associated with a resource 108 (e.g., a resource of a bank, a shipping provider, a restaurant, a health service provider, or a parking lot service provider). In one aspect, the at least two contained spaces 10 may each be a bank lobby of a respective branch of a bank.

In another embodiment, the one or more objects of interest 212 are labeled as being within one or more vehicles. The at least two contained spaces 10 may each be at least a drive-through location or a parking lot of a physical vendor (e.g., a bank, a restaurant, or a health service provider).

In block 404, via the time-series-based prediction model 103 of the APS of the AI prediction system 200, a prediction 216 may be generated of a future number of the one or more objects of interest 212 in the at least two contained spaces 10 within a future period of time after the period of time.

In block 406, the AI prediction system 200 is configured to recommend as a recommendation to a user one of the at least two contained spaces 10 for the user to select as a destination within the future period of time based on the prediction 216 of the future number of one or more objects of interest 212 in each of the at least two contained spaces 10.

In embodiments, the AVDS 204 of the AI prediction system 200 may be utilized to analyze the image of each of the at least two contained spaces 10. Each image may include a real-time video feed of at least two contained spaces 10. Based on the analysis of the real-time video feed, one or more objects may be detected by the AVDS 204 within the at least two contained spaces. At least one or more of the one or more objects in the at least two contained spaces may be classified by the AVDS 204 as the one or more objects of interest 212.

The CVS 202 of the AI prediction system 200 may be utilized to detect a monitored number of occupants 210 in the at least two contained spaces 10. Responsive to the monitored number of occupants, the CVS 202 may be utilized to generate the real-time video feed.

In embodiments, the at least two contained spaces 10 associated with resources 108 may be a physical building location of a first vendor, a parking lot, or a drive-through location of a second vendor. The first vendor may be one of a bank, a restaurant, a health service provider, or a parking lot service provider. The second vendor may be of the same type as the first vendor (e.g., a corresponding one of a bank, a restaurant, a health service provider, or a parking lot service provider). In an aspect, the first vendor may be the bank, the second vendor is the bank, each physical building location is a bank lobby of a branch of the bank, and each drive-through location is a drive-through window associated with the bank.

In additional or alternative embodiments, a minimum wait time at each of the at least two contained spaces may be generated via the AI prediction system 200. The AI prediction system 200 may further recommend as the recommendation to the user the one of the at least two contained spaces 10 for the user to select as the destination within the future period of time further based on the minimum wait time at each of the at least two contained spaces 10.

A distance of each of the at least two contained spaces 10 to a location of the user can be generated via a location module (such as one communicatively coupled to the user mobile device 102). The AI prediction system 200 may recommend, as the recommendation to the user, the one of the at least two contained spaces 10 for the user to select as the destination within the future period of time further based on the distance of each of the at least two contained spaces 10 to the location of the user.

Additionally or alternatively, an amount of traffic along a respective route to each of the at least two contained spaces 10 from the location of the user may be determined by the location module. The location module may generate a travel time prediction along each respective route based on the amount of traffic along each respective route. The AI prediction system 200 may recommend, as the recommendation to the user, the one of the at least two contained spaces 10 for the user to select as the destination within the future period of time further based on the travel time prediction along each respective route to each of the at least two contained spaces 10. In embodiments, the recommendation may be transmitted to and display on the GUI 300 of the user mobile device 102 of the user.

In embodiments, via the time-series-based prediction model 103 of the AI prediction system 200, a prediction 216 may be generated of a second future number of the one or more objects of interest 212 in the at least two contained spaces 10 within a second future period of time after the future period of time. The future period of time may be a pre-determined period of time directly after the period of time or a selected period of time after the period of time with a time interval therebetween. A second recommendation to the user to not select the recommendation and to wait until the second future period of time after the future period of time may be generated by the AI prediction system 200 when the prediction 216 of the second future number of the one or more classified objects 212 in the at least two contained spaces 10 is less than the prediction 216 of the future number of the one or more objects of interest 212 in each of the at least two contained spaces 10. In such an instance, the prediction 216 of the future number of the one or more classified objects (e.g., objects of interest 212) would have more counts of the objects of interest 212 than the prediction 216 of the second future number of the one or more objects of interest 212 in the at least two contained spaces 10 at a later time. Thus, the recommendation would indicating waiting until a later time with fewer occupants predicted in the at least two contained spaces 10.

Figure 5A:
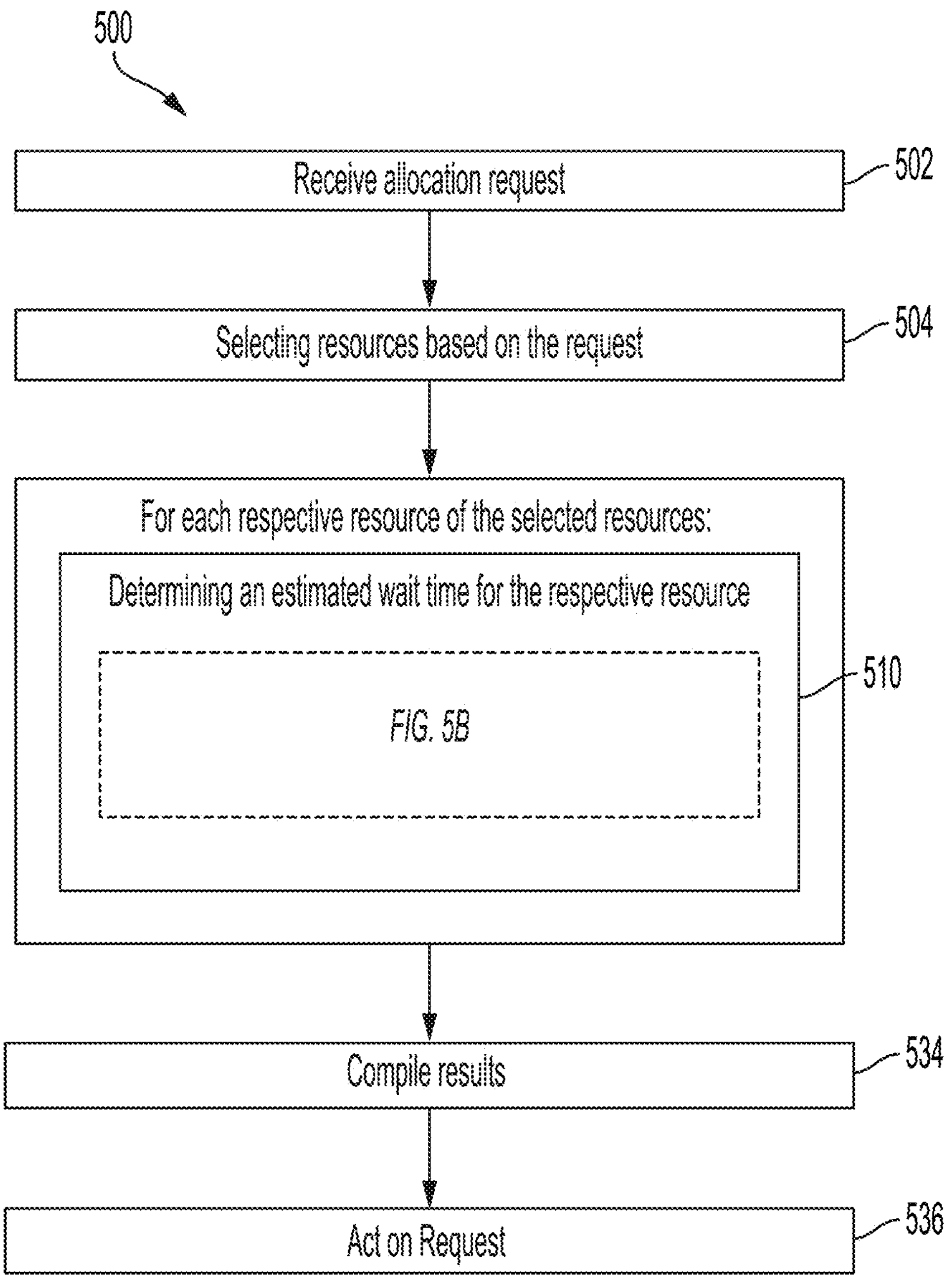
FIG. 5, which is made up of FIGS. 5A and 5B, illustrates another example process.
Figure 5B:
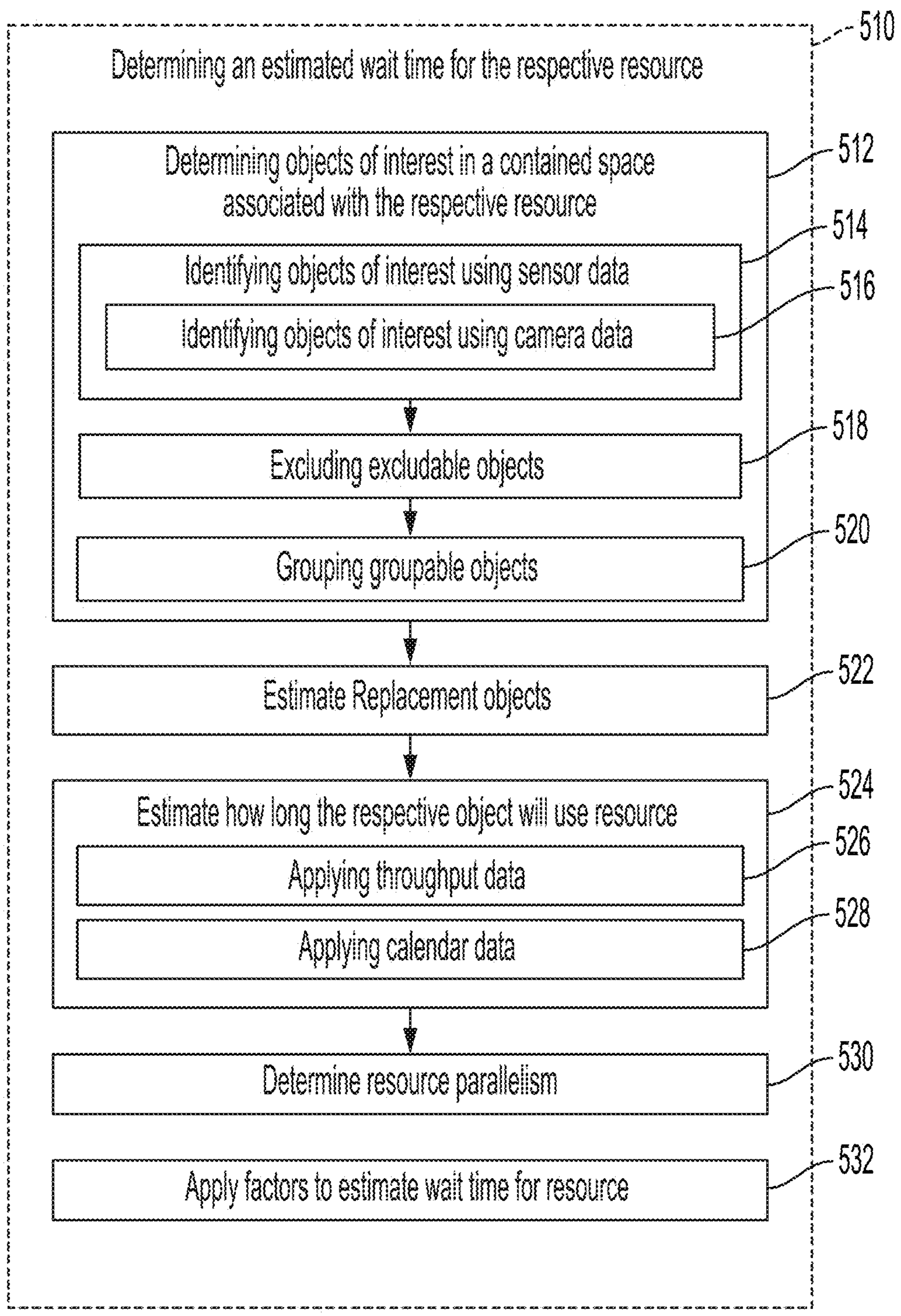

FIG. 5, which is made up of FIGS. 5A and 5B, illustrates an example method 500, such as may be implemented using processor-executable instructions stored in a computer readable medium. The method may be performed by the allocator 104 on the server 110. The method can start with operation 502.

Operation 502 includes receiving an allocation request. In some examples, the allocation request includes information regarding what kind of allocation is requested. For example, the request may include a request for an estimated wait time for a particular resource 108, an estimated wait time for any resource 108 fulfilling certain criteria (e.g., within a particular distance, able to be used to fulfill a specific task, which may be specified by the request), a recommendation for which resource 108 to use for a particular action, other requests, or combinations thereof. The request may include a request to be allocated to a resource 108. In some examples, the request to generate the estimated wait time is received from a user device 102. As discussed above, a user device 102 may execute an application that provides a user interface configured to receive, from a user, information regarding the request. The application can then send the request in a format usable by the allocator 104 (e.g., using an application programming interface associated with the allocator 104). The user may be a customer interested in using the resource 108. In other examples, the request is from a device associated with a provider of the resource 108 for instance, the provider may want to understand a predicted future utilization of resources 108 (e.g., as expressed in estimated wait time or another relevant data point) to modify the throughput of the resources 108. Such improvements may include altering employee scheduling or allocation to improve metrics (e.g., wait time) at a time where the metrics are predicted to not satisfy a desired threshold. In another example, the improvements may include automatically allocating additional computing resources to supporting one or more resources to improve speed of a resource at a given time. Further, the metrics can be used to decrease allocations of energy, personnel, or other supplies to support a resource 108 based on predicted future use, thereby improving efficiency. Following operation 502, the flow of the method can move to operation 504.

Operation 504 includes selecting a group of resources based on the request. In some examples, the request already specifies resources 108 and the selecting can include selecting those resources 108. In some examples, even if the request specifies particular resources 108, this operation can include selecting similar nearby resources 108 to provide additional flexibility to the user in case the selected resources are unacceptable. In some examples, the selected resources 108 are resources that the user previously used, looked at, or requested, such as based on loading stored prior interaction data from memory. In some examples, a group of nearby resources 108 is selected. This may be based on geographic proximity of the user to the resources 108. The proximity can be determined in any of a variety of ways. For instance, all resources 108 within a request-specified or predetermined distance from a location can be selected. The location can be the location specified in the request or a predicted location of the user (e.g., based on stored geographic information about the user or prior history). In some examples, the proximity is based on an estimated amount of time to reach the resource from the location using a form of transportation (e.g., walking, biking, public transit, or driving as specified by the request or inferred from previously determined user preferences for transportation). The distance or travel time calculation can be determined using an application programming interface of any of a variety of known mapping applications or services, such as AZURE MAPS by MICROSOFT, AMAZON LOCATION SERVICES by AMAZON, GOOGLE MAPS PLATFORM by GOOGLE, other services, or combinations thereof. Such services can account for factors such as traffic or road construction in providing the calculation. In some examples, the resources 108 are selected or filtered based on the availability of the resource 108, such as availability of the resource 108 in general (e.g., the building the resource 108 is in is closed or the resource 108 may be offline) or capability of the resource 108 to fulfill a specific task specified by or inferred from the request (e.g., an ATM may be able to receive a deposited check but not support cashing a check). Other factors may be used in selecting the resources 108, such as predetermined weightings of resources 108. In some implementations, it may be beneficial to include certain resources 108 capable of fulfilling a request but that would otherwise be excluded (e.g., because they weren't specified or because they are slightly outside of a distance threshold). Those resources 108 may be included based on a weighting of how far outside of the requirements the resource 108 is. A provider of the resource 108 may find it beneficial to encourage a user to go to a resource that they might not otherwise would because the resource 108 is new or recently renovated or because of beneficial amenities provided in an area (e.g., the resource 108 may be an ATM located within a grocery store and the user may want to shop there). Using one or more of the above techniques, one or more resources can be selected for use in additional operations.

Following operation 504, the flow of the method 500 can move to operation 510.

Operation 510 includes determining an estimated wait time for the respective resource 108 of the selected resources 108. While this operation 510 refers to wait time, any other relevant metric (e.g., throughput) may be determined instead using analogous techniques to those described herein. The relevant metric can be determined based on the request. Operation 510 can include operations 512, 520, 530, and 532, which are shown in FIG. 5B and described in more detail below.

Operation 512 includes determining a number of relevant objects of interest in a contained space 10 associated with the respective resource 108. The operation 512 can include determining a contained space 10 associated with a resource 108. In some examples, a database or other data structure specifies the one or more contained spaces 10 associated with a resource 108 as well as one or more sensors 109 associated with the resource 108 or which monitor the determined contained space 10 associated with the resource 108. The sensors 109 can be used to directly or indirectly determine the number of objects of interest in the contained space. The operation 512 can include operation 514.

Operation 514 can include identifying objects of interest using sensor data. For example, a contained space 10 may include one or more sensors, the output from which is usable to determine objects within a contained space 10. Sensors 109 may include motion sensors, proximity sensors, activation sensors for turnstiles or other access gates, activation sensors for doors, cameras, air quality sensors, other sensors, or combinations thereof. The sensors 109 can be used to count or estimate the number of objects of interest within the contained space 10. For example, motion sensors can detect movement in the space and use that data to, for instance count the number of objects (such as individuals) entering or exiting the contained space 10 to determine the number of objects of interest there. In another example, a carbon dioxide sensor can be used to measure the amount of carbon dioxide in the room and use the amount to infer the number of individuals in the contained space 10 that would cause that level of carbon dioxide (manual or automatic calibration of an algorithm can be used to create a lookup table or function that produces an indication of the number of people in a space given a particular carbon dioxide level). In a further example described below, operation 514 can include operation 516 in which video or image data are used. As described in more detail below, the number of objects is refined using any of a number of processes to increase the accuracy of the count of objects of interest. An object may be of interest based on the likelihood of the object (such as an individual or vehicle) affecting the resource 108 or the requested metric.

Operation 516 includes identifying objects of interest using camera data. For example, this can include using techniques such as those discussed above, such as in relation to FIG. 2. In addition or instead, object detection libraries can be used, such as OPENCV by the OPENCV community or the Segment Anything Model by META. In some examples, the object detection is performed on individual frames or the object detection is performed on video data. In some instances, beyond mere object detection, this step can include determining behaviors that the individual is engaging in as well as inferring the presence of an individual in an area even if the individual is not visible in a current frame. In some examples, a machine learning model is trained on representative training data to produce useful output (e.g., a classification of detected behavior in a segment of the frame containing an individual as segmented by the Segment Anything Model) based on input (e.g., one or more frames from video). Representations of the identified objects of interest can be stored in any of a variety of ways and with any of a variety of useful metadata. Following operation 514 or 516, the flow can move to operation 518.

Operation 518 includes excluding excludable objects from being counted as an object of interest. For instance, there may be individuals in a contained space 10 that are not likely to use an associated resource 108. For instance, there may be individuals that are employees, service personnel, children, or other people visible within the frame that should be excluded from a count. Likewise, vehicles of such individuals can be objects excluded from a count where vehicles are present. So too should individuals tracked as having left a vehicle but did not enter an area of the resource be excluded (e.g., an individual parked in the bank's parking lot but went elsewhere). Individuals to be excluded can be identified using recognition techniques. For instance, various known facial or other recognition techniques can be used to identify known employees, service personnel, or others. Those individuals can then be excluded. Further still, individuals wearing a specific uniform (e.g., a uniform of a company operating the resource) or article (e.g., an employee or visitor badge can be excluded in this operation. An image recognition algorithm (e.g., a template matching algorithm, such as is provided by OPENCV) can be used to identify individuals wearing such items and then can be excluded. As another example, individuals already having been otherwise accounted for can be excluded. For instance, there may be individuals that checked in with a teller and are waiting for a banker. Such individuals may be waiting within the contained space 10 but whose presence are already accounted for through other techniques (e.g., via a check-in function provided by the teller). Already accounted for individuals can be identified by tracking their presence within the bank and determining their behaviors. For instance, someone that has been identified as waiting, then speaking with a teller, and then sitting and waiting in a chair may be considered as already having been checked in or otherwise accounted for and they can be excluded in the operation. An individual object identified as being excludable can be excluded from a list (or other data structure) of objects of interest or otherwise marked as not needing to be accounted for. Objects can be excluded based on a same or different modality from the way in which the objects are counted. For instance, based on a badging or other authentication system, it can be determined that a certain number of employees are present in the field of view of camera counting objects can be excluded. Objects (such as individuals) can be excluded if they are detected within exclusion areas. For example, a camera observing a contained space 10 can nonetheless record individuals outside of the contained space (e.g., people walking outside may be visible through a window) or within the contained space but outside of a queuing area for a resource 108 (e.g., tellers may be visible or bankers in background offices may be visible). Such regions can be manually determined (e.g., a user can manually paint areas of a frame as being an exclusion zone) or the exclusion of objects in those zones can be learned through a machine learning algorithm. Following operation 518, the flow can move to operation 520.

Operation 520 includes grouping groupable objects. For instance, the grouping may combine multiple individuals into a single group for waiting count purposes. The grouping may be based on identifying people likely to use a resource together. For instance, a couple may be at a bank branch to access a safe deposit box together or a child may be with a parent at a pharmacy. So each group would count as a single entity (e.g., single individual of interest) waiting rather than two different ones. The system may distinguish between such groups using any of a variety of techniques. For instance, people in a same group may stand closer together than people queuing in separate groups. The system may identify such a group by determining a distance (e.g., an average or instantaneous distance) between the entities to determine whether they should be group. Behaviors can also be used to make such a determination. For instance, if the individuals are talking together, showing documents to each other, or performing other actions that may indicate that they should be considered a single group. The allocator 104 can be trained to determine a behavior of individuals and use behavior amounts above a threshold as an indication that they should be considered together. As a result, the individuals can be grouped such that they are considered a single entity (and only count as one rather than, say, two people for the purposes of determining potential utilization). The grouping can result in the system tracking the individuals as a group (e.g., marking the identifiers of the individuals of the group as being together) or by excluding all but one of the individuals of the group from being counted as an object of interest 212. In other examples, all but one of the individuals in the group can be excluded from being an individual of interest.

As discussed above in relation to operations 518 and 520, objects (such as individuals) may be present in a relevant area (e.g., contained space) but may nonetheless ought not to be factored into an estimation of how busy the resource is. By excluding or grouping individuals for estimation purposes, the system provides higher levels of accuracy over traditional techniques that may simply count a number of mobile devices detected in an area at a given time regardless of whether they should be counted.

Following operation 512, the flow of the method 500 can move to operation 522.

Operation 522 includes estimating replacement objects of interest 212. Operation 512 can account for objects currently within the contained space 10. However, more objects may arrive in the contained space 10 between a current time and a predicted future time (e.g., a future time at which an individual sending the request will arrive at the resource 108. Thus, in some instances, it may be useful to add additional objects of interest 212 even though they are not currently present in the scene. The objects of interest can be assumed to be added at a particular time in the future and can thus affect the calculation. Historic data can be used to estimate the number of replacement objects to account for (e.g., how many individuals or vehicles typically arrive at a similar point in time). In some instances, replacement individuals can be inferred based on a number of factors, such as a current activity level at the contained space 10 (e.g., if the space is busy or light, then there may be respectively higher or lower levels of replacement individuals) or a current activity level of a nearby street, sidewalk, or parking lot (e.g., which may increase or decrease walk-in traffic).

The estimation of the replacement objects can include applying allocation data. In some examples, the allocator 104 can obtain data from other allocations made by the allocator 104. For instance, the allocator 104 may receive information about other users interested in being directed to a resource 108. Those other users may specify what kind of resource they want to be directed to or which kind of activity they want to engage in. The allocator 104 may then remember (e.g., store in memory) the users, activity, and resource directed to. Thus, the allocator 104 can store and recall those users and their associated activity directed to the resource. Thus, when later users request to be directed to a resource, the allocator 104 can take into account those other objects that may be directed to the resource but that have not yet arrived (e.g., are not yet visible in the contained area). This data can further be used to estimate what activities people within the contained area are waiting for. For instance, there may be people queued for a teller and the allocator 104 determines that at least one of those people arrived at a time that might correspond to a user request for allocation previously received. Then it can be assumed that at least one of those users is there for that purpose and the allocator 104 can change the time estimate accordingly.

Following operation 522, the flow of the method can move to operation 524

Operation 524 can include estimating how long the respective individual will use the resource. In some instances, the operation includes applying a default time estimate. Such data can be used to improve accuracy of usage data and wait times. Operation 524 can include one or more of operations 526 and 528.

Operation 526 can include applying throughput data associated with the resource 108. For instance, the throughput data for the resource 108 can describe how long the resource takes to help an individual. For instance, an ATM may have data regarding how long each user session takes or an average user session takes. For example, the time could be the total amount of time the user stands in front of the machine before walking away (e.g., as could be monitored by a camera of the ATM or a camera monitoring the resource) or how long the machine takes to go from receiving a first user input of a session to providing a last output to the user of that session. Similar information can be obtained and stored for other resources 108 (e.g., an average time it takes a teller or banker to help a customer). Such throughput can vary across locations, time, and resources 108 and such variations can be stored. By obtaining and using this data, accuracy of time predictions can be improved.

Operation 528 can include applying data associated with calendars associated with the resource 108, which can be used to identify events that may affect throughput or availability of the resource 108. For instance, where the resource is an object (e.g., ATM), the object may have a maintenance schedule identifying when it will be taken offline for maintenance. For resources 108 dependent on personnel, calendars of the personnel can be accessed to determine an availability of the personnel to support the resource 108. Such calendars can be used to identify blocks of time where the resource 108 may be more constrained. For example, two thirds of bankers at a branch may have time blocked off in their calendar for a meeting and so the number of bankers free to assist walk in customers will be limited until those calendars clear. Further, meetings ending may contribute to a sudden decrease in the number of people waiting because throughput for the banker resource will suddenly increase (e.g., triple in the above example). Thus, such data can apply to improve the accuracy of the estimate for long the individual will use the resource 108.

Following operation 528, the flow of the method can move to operation 530.

Operation 530 can include determining resource parallelism. While some resources 108 can be used on a one to one basis (e.g., one resource 108 can serve only one individual or group at a time), other resources may have a one to many arrangement. For example, a drive through of a bank may have multiple lanes, a bank may have multiple teller windows, and a bank may have multiple banker offices. Thus, the ability of resources to be used by multiple objects (such as individuals) at a same time can be used as a factor in determining weight time. The parallelism of a particular resource can vary based on factors such as how many tellers, bankers, or lanes are actually available to help individuals (e.g., which may be determined based on calendar information as described above).

Operation 532 includes applying the factors to estimate a wait time for the resource 108. In an example, the factors include one or more factors selected from the group consisting of: the determined number of objects of interest, the estimated number of replacement individuals, the estimated amount of time respective individuals will use the resource, the resource parallelism, other factors, or combinations thereof. In an example, the factors are put into a formula and the output is the estimated wait time. In an example, the formula is:

$$w = \frac{(i_o + i_r)}{p} \times t$$

Where w is the estimated wait time, $i_o$ is the number of observed objects of interest (e.g., after exclusions and grouping), $i_r$ is the estimated number of replacement individuals p that will arrive before the requestor arrives, and t is the estimated amount of time each individual will take to use the resource. There are ways to increase the accuracy of this estimate. For example, the above equation assumes that all replacement individuals will arrive and be processed at the current time, but that will not always be the case. A technique with improved accuracy will include estimating arrival of the replacement individuals over time. Further, the above equation assumes that the time for each individual is the same. A technique with improved accuracy will include estimating a custom time for each individual, if the determination of such custom time is possible (e.g., the system may not be able to know or infer the wait time of the individual). Further, the wait time may change over time as the resource changes and an improvement can be made by varying the time accordingly over time.

In addition or instead of using the above equation or a variant, a machine learning framework can be used. For example, the above and other factors can be provided as input to a machine learning framework (e.g., a trained neural network or other machine learning framework as described below) and the estimated wait time can be provide as output. In some examples, the machine learning framework is trained on observations. For instance, the above factors can be determined and the actual wait time can be observed and stored as training data to improve the accuracy of the estimates.

In some examples, the allocator 104 can obtain data from other data sources and use that data as a factor in estimating the wait time for a resource 108. In some examples, the allocator 104 can obtain historic data. The historic data can include observed prior data regarding the usage of a resource 108 during analogous periods of time. For instance, the actual observed wait time or usage of a resource can be stored along with data describing the circumstances of the observed wait time. The data can include various descriptors of circumstances including hour of the day, part of a day, day of the week, week of a month, month of a year, nearby holidays (e.g., a number of weeks or days until Christmas or Thanksgiving or whether the current, preceding, or next week includes a bank holiday). That data can be stored on a per-resource 108 basis or aggregated based on similar resources 108. For instance there may not be statistically significant historic data for a given ATM, but there may be significance for data drawn from multiple different ATMs within a similar geography or other grouping of resources 108. For aggregation purposes, resources 108 may be grouped according to any of a variety of groupings, such as geographic location (e.g., city or state), geographic characteristics (e.g., population of surrounding area, distance from public transportation, distance from major highways, location type, other characteristics, or combinations thereof). The historic data can be stored as an actual wait time or resource utilization or as a relative change from a baseline (e.g., Friday afternoons are 10% busier than usual for a particular resource 108).

Following operation 532, the flow of the method 500 can move to operation 534, which is shown and described in relation to FIG. 5A.

Operation 534 can include compiling the results for the resources. In certain implementations of the above, the system will produce an estimated wait time for each selected resource. Such information can be collected and compiled into a useful data structure or format for responding to the request. For instance, the information may be put into a table, list, or other structure.

Operation 536 can include acting on the request. This can depend on the nature of the request. In some examples, acting on the request can include providing the compiled data to the requestor in a useful format, such as is shown in FIG. 3. Thus a user can use the data to more efficiently plan which resource they are going to. By allocating the user in this way, the throughput of the overall system is improved by allocating tasks to resources that are more likely to be able to handle them efficiently. In addition or instead, if the task the user wants to do is known and able to be done using the mobile application or via a call, the application may also indicate to the user that they can save time (and potentially fuel) by performing the task on the mobile application or via a call. In some examples, acting on the request can include a resource providing a wait time. For instance, a bank branch may provide a display indicating an estimated wait time so an individual waiting can estimate how long the wait will be.

Further, a single branch may have multiple resources (e.g., drive through, teller, or ATM) and the display can help direct users to different resources within the bank based on wait time. In still further examples, acting on the request can include improving the throughput or efficiency of the resource. For instance, where it is predicted that the resource will experience more or less use, the processing power, energy usage, or other resources consumed by the resource itself can be throttled up or down accordingly. Acting on the request can include physically opening or closing access to resources, such as teller lanes, drive through lanes, doors, or other aspects.

Figure 6:
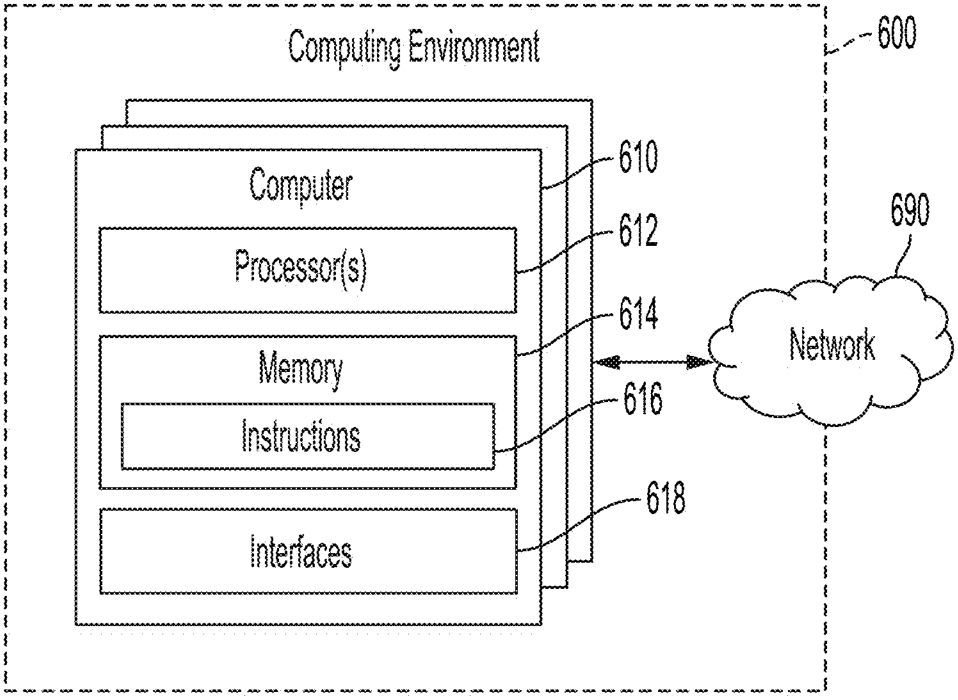
FIG. 6 schematically depicts a computing environment that can be used to implement aspects described herein, such as the AI prediction system of FIG. 2, according to one or more embodiments described and illustrated herein.

FIG. 6 discloses a computing environment 600 in which aspects of the present disclosure may be implemented. The computing environment 600 may be utilized by the AI prediction system 200 of FIG. 2 as described herein. Aspects described herein regarding the computing environment 600 can be used to implement aspects of the user device 102, server 110, certain resources 108, certain sensors 109, other aspects, or combinations thereof. A computing environment 600 is a set of one or more virtual or physical computers 610 that individually or in cooperation achieve tasks, such as implementing one or more aspects described herein. The computers 610 have components that cooperate to cause output based on input. Example computers 610 include desktops, servers, mobile devices (e.g., smart phones and laptops), wearables, virtual/augmented/expanded reality devices, spatial computing devices, virtualized devices, other computers, or combinations thereof. In particular example implementations, the computing environment 600 includes at least one physical computer.

The computing environment 600 may specifically be used to implement one or more aspects described herein. In some examples, one or more of the computers 610 may be implemented as a user device, such as mobile device and others of the computers 610 may be used to implement aspects of a machine learning framework useable to train and deploy models exposed to the mobile device or provide other functionality, such as through exposed application programming interfaces.

The computing environment 600 can be arranged in any of a variety of ways. The computers 610 can be local to or remote from other computers 610 of the environment 600. The computing environment 600 can include computers 610 arranged according to client-server models, peer-to-peer models, edge computing models, other models, or combinations thereof.

In many examples, the computers 610 are communicatively coupled with devices internal or external to the computing environment 600 via a network 602. The network 602 is a set of devices that facilitate communication from a sender to a destination, such as by implementing communication protocols. Example networks 602 include local area networks, wide area networks, intranets, or the Internet.

In some implementations, computers 610 can be general-purpose computing devices (e.g., consumer computing devices). In some instances, via hardware or software configuration, computers 610 can be special purpose computing devices, such as servers able to practically handle large amounts of client traffic, machine learning devices able to practically train machine learning models, data stores able to practically store and respond to requests for large amounts of data, other special purposes computers, or combinations thereof. The relative differences in capabilities of different kinds of computing devices can result in certain devices specializing in certain tasks. For instance, a machine learning model may be trained on a powerful computing device and then stored on a relatively lower powered device for use.

Many example computers 610 include one or more processors 612, memory 614, and one or more interfaces 618. Such components can be virtual, physical, or combinations thereof.

The one or more processors 612 are components that execute instructions, such as instructions that obtain data, process the data, and provide output based on the processing. The one or more processors 612 often obtain instructions and data stored in the memory 614. The one or more processors 612 can take any of a variety of forms, such as central processing units, graphics processing units, coprocessors, tensor processing units, artificial intelligence accelerators, microcontrollers, microprocessors, application-specific integrated circuits, field programmable gate arrays, other processors, or combinations thereof. In example implementations, the one or more processors 612 include at least one physical processor implemented as an electrical circuit. Example providers processors 612 include INTEL, AMD, QUALCOMM, TEXAS INSTRUMENTS, and APPLE.

The memory 614 is a collection of components configured to store instructions 616 and data for later retrieval and use. The instructions 616 can, when executed by the one or more processors 612, cause execution of one or more operations that implement aspects described herein. In many examples, the memory 614 is a non-transitory computer readable medium, such as random access memory, cache memory, read only memory, cache memory, registers, portable memory (e.g., enclosed drives or optical disks), mass storage devices, hard drives, solid state drives, other kinds of memory, or combinations thereof. In certain circumstances, transitory memory 614 can store information encoded in transient signals.

The one or more interfaces 618 are components that facilitate receiving input from and providing output to something external to the computer 610, such as visual output components (e.g., displays or lights), audio output components (e.g., speakers), haptic output components (e.g., vibratory components), visual input components (e.g., cameras), auditory input components (e.g., microphones), haptic input components (e.g., touch or vibration sensitive components), motion input components (e.g., mice, gesture controllers, finger trackers, eye trackers, or movement sensors), buttons (e.g., keyboards or mouse buttons), position sensors (e.g., terrestrial or satellite-based position sensors such as those using the Global Positioning System), other input components, or combinations thereof (e.g., a touch sensitive display). The one or more interfaces 618 can include components for sending or receiving data from other computing environments or electronic devices, such as one or more wired connections (e.g., Universal Serial Bus connections, THUNDERBOLT connections, ETHERNET connections, serial ports, or parallel ports) or wireless connections (e.g., via components configured to communicate via radiofrequency signals, such as according to WI-FI, cellular, BLUETOOTH, ZIGBEE, or other protocols). One or more of the one or more interfaces 618 can facilitate connection of the computing environment 600 to a network 690.

The computers 610 can include any of a variety of other components to facilitate performance of operations described herein. Example components include one or more power units (e.g., batteries, capacitors, power harvesters, or power supplies) that provide operational power, one or more busses to provide intra-device communication, one or more cases or housings to encase one or more components, other components, or combinations thereof.

A person of skill in the art, having benefit of this disclosure, may recognize various ways for implementing technology described herein, such as by using any of a variety of programming languages (e.g., a C-family programming language, PYTHON, JAVA, RUST, HASKELL, other languages, or combinations thereof), libraries (e.g., libraries that provide functions for obtaining, processing, and presenting data), compilers, and interpreters to implement aspects described herein. Example libraries include NLTK (Natural Language Toolkit) by Team NLTK (providing natural language functionality), PYTORCH by META (providing machine learning functionality), NUMPY by the NUMPY Developers (providing mathematical functions), and BOOST by the Boost Community (providing various data structures and functions) among others. Operating systems (e.g., WINDOWS, LINUX, MACOS, IOS, and ANDROID) may provide their own libraries or application programming interfaces useful for implementing aspects described herein, including user interfaces and interacting with hardware or software components. Web applications can also be used, such as those implemented using JAVASCRIPT or another language. A person of skill in the art, with the benefit of the disclosure herein, can use programming tools to assist in the creation of software or hardware to achieve techniques described herein, such as intelligent code completion tools (e.g., INTELLISENSE) and artificial intelligence tools (e.g., GITHUB COPILOT).

Figure 7:
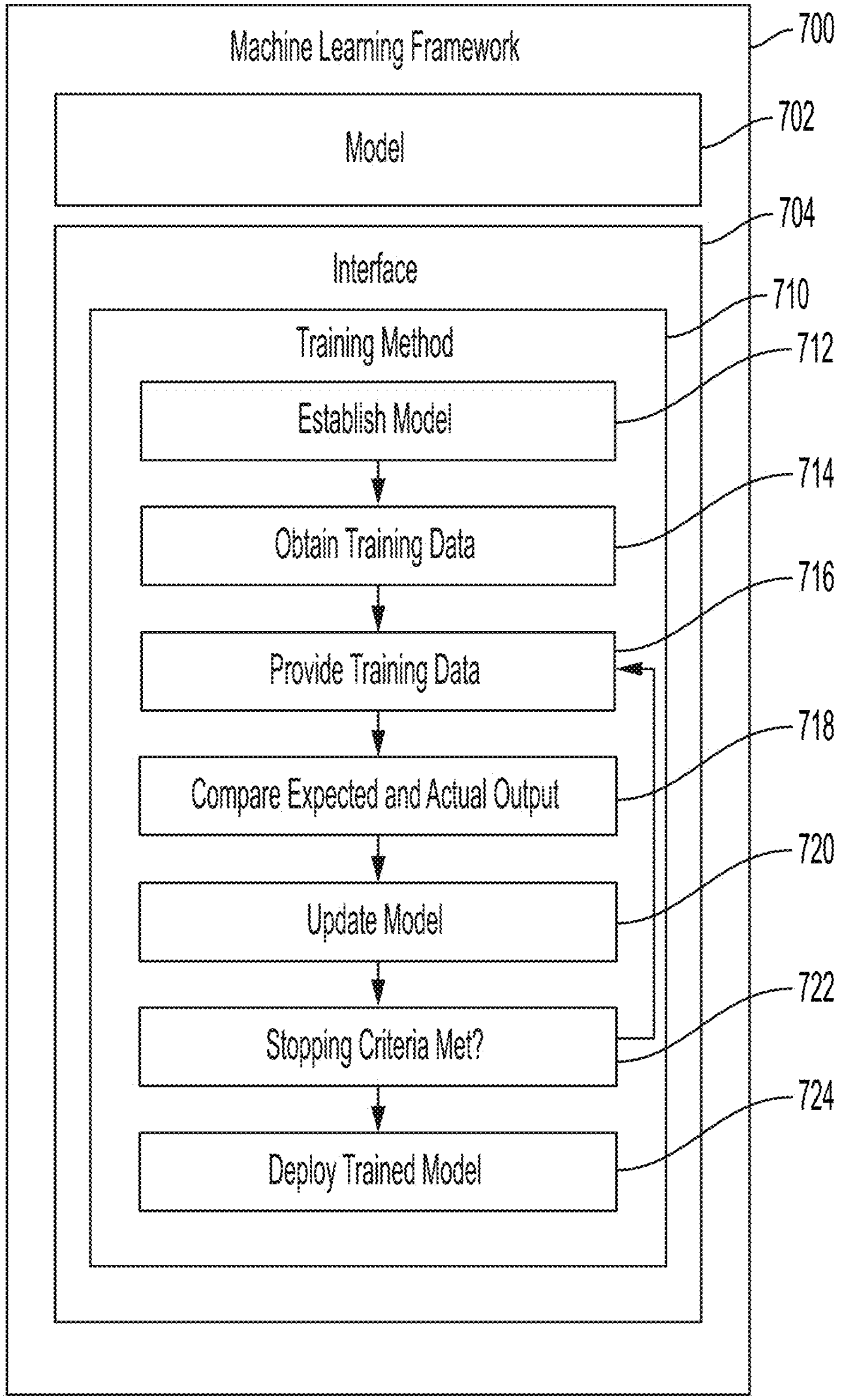
FIG. 7 schematically depicts a machine learning framework that can be used to implement aspects described herein, according to one or more embodiments described and illustrated herein.

FIG. 7 illustrates an example machine learning framework 700 that techniques described herein may benefit from. The machine learning framework 700 may be utilized by the AI prediction system 200 of FIG. 2 or other aspects described herein. A machine learning framework 700 is a collection of software and data that implements artificial intelligence trained to provide output, such as predictive data, based on input. Examples of artificial intelligence that can be implemented with machine learning way include neural networks (including recurrent neural networks), language models (including so-called "large language models"), generative models, natural language processing models, adversarial networks, decision trees, Markov models, support vector machines, genetic algorithms, others, or combinations thereof. A person of skill in the art having the benefit of this disclosure will understand that these artificial intelligence implementations need not be equivalent to each other and may instead select from among them based on the context in which they will be used. Machine learning frameworks 700 or components thereof are often built or refined from existing frameworks, such as TENSORFLOW by GOOGLE, INC. or PYTORCH by the PYTORCH community.

The machine learning framework 700 can include one or more models 702 that are the structured representation of learning and an interface 704 that supports use of the model 702.

The model 702 can take any of a variety of forms. In many examples, the model 702 includes representations of nodes (e.g., neural network nodes, decision tree nodes, Markov model nodes, other nodes, or combinations thereof) and connections between nodes (e.g., weighted or unweighted unidirectional or bidirectional connections). In certain implementations, the model 702 can include a representation of memory (e.g., providing long short-term memory functionality). Where the set includes more than one model 702, the models 702 can be linked, cooperate, or compete to provide output.

The interface 704 can include software procedures (e.g., defined in a library) that facilitate the use of the model 702, such as by providing a way to establish and interact with the model 702. For instance, the software procedures can include software for receiving input, preparing input for use (e.g., by performing vector embedding, such as using Word2Vec, BERT, or another technique), processing the input with the model 702, providing output, training the model 702, performing inference with the model 702, fine tuning the model 702, other procedures, or combinations thereof.

In an example implementation, interface 704 can be used to facilitate a training method 710 that can include operation 712. Operation 712 includes establishing a model 702, such as initializing a model 702. The establishing can include setting up the model 702 for further use (e.g., by training or fine tuning). The model 702 can be initialized with values. In examples, the model 702 can be pretrained. Operation 714 can follow operation 712. Operation 714 includes obtaining training data. In many examples, the training data includes pairs of input and desired output given the input. In supervised or semi-supervised training, the data can be prelabeled, such as by human or automated labelers. In unsupervised learning the training data can be unlabeled. The training data can include validation data used to validate the trained model 702. Operation 716 can follow operation 714. Operation 716 includes providing a portion of the training data to the model 702. This can include providing the training data in a format usable by the model 702. The framework 700 (e.g., via the interface 604) can cause the model 702 to produce an output based on the input. Operation 718 can follow operation 716. Operation 718 includes comparing the expected output with the actual output. In an example, this can include applying a loss function to determine the difference between expected and actual. This value can be used to determine how training is progressing. Operation 720 can follow operation 718. Operation 720 includes updating the model 702 based on the result of the comparison. This can take any of a variety of forms depending on the nature of the model 702. Where the model 702 includes weights, the weights can be modified to increase the likelihood that the model 702 will produce correct output given an input. Depending on the model 702, backpropagation or other techniques can be used to update the model 702. Operation 722 can follow operation 720. Operation 722 includes determining whether a stopping criterion has been reached, such as based on the output of the loss function (e.g., actual value or change in value over time). In addition or instead, whether the stopping criterion has been reached can be determined based on a number of training epochs that have occurred or an amount of training data that has been used. In some examples, satisfaction of the stopping criterion can include If the stopping criterion has not been satisfied, the flow of the method can return to operation 714. If the stopping criterion has been satisfied, the flow can move to operation 722. Operation 722 includes deploying the trained model 702 for use in production, such as providing the trained model 702 with real-world input data and produce output data used in a real-world process. The model 702 can be stored in memory 614 of at least one computer 610, or distributed across memories of two or more such computers 610 for production of output data (e.g., predictive data).

Techniques herein may be applicable to improving technological processes of a financial institution, such as technological aspects of transactions (e.g., resisting fraud, entering loan agreements, transferring financial instruments, or facilitating payments). Although technology may be related to processes performed by a financial institution, unless otherwise explicitly stated, claimed inventions are not directed to fundamental economic principles, fundamental economic practices, commercial interactions, legal interactions, or other patent ineligible subject matter without something significantly more.

Where implementations involve personal or corporate data, that data can be stored in a manner consistent with relevant laws and with a defined privacy policy. In certain circumstances, the data can be decentralized, anonymized, or fuzzed to reduce the amount of accurate private data that is stored or accessible at a particular computer. The data can be stored in accordance with a classification system that reflects the level of sensitivity of the data and that encourages human or computer handlers to treat the data with a commensurate level of care.

Where implementations involve machine learning, machine learning can be used according to a defined machine learning policy. The policy can encourage training of a machine learning model with a diverse set of training data. Further, the policy can encourage testing for and correcting undesirable bias embodied in the machine learning model. The machine learning model can further be aligned such that the machine learning model tends to produce output consistent with a predetermined morality. Where machine learning models are used in relation to a process that makes decisions affecting individuals, the machine learning model can be configured to be explainable such that the reasons behind the decision can be known or determinable. The machine learning model can be trained or configured to avoid making decisions based on protected characteristics.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

It is also noted that recitations herein of "at least one" component, element, etc., should not be used to create an inference that the alternative use of the articles "a" or "an" should be limited to a single component, element, etc. It is noted that recitations herein of a component of the present disclosure being "configured" or "programmed" in a particular way, to embody a particular property, or to function in a particular manner, are structural recitations, as opposed to recitations of intended use.

It is also noted that recitations herein of "at least one" component, element, etc., should not be used to create an inference that the alternative use of the articles "a" or "an" should be limited to a single component, element, etc. It is noted that recitations herein of a component of the present disclosure being "configured" or "programmed" in a particular way, to embody a particular property, or to function in a particular manner, are structural recitations, as opposed to recitations of intended use.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

Aspects Listing

Aspect 1. A non-transitory computer readable medium having instructions that, when executed by one or more processors, cause the one or more processors of an artificial intelligence (AI) prediction system to convert one or more objects of interest from a respective image of each of at least two contained spaces into respective one or more numerical counts indicative of a number of the one or more objects of interest in the at least two contained spaces within a period of time; generate, via a time-series-based prediction model, a prediction of a future number of the one or more objects of interest in the at least two contained spaces within a future period of time after the period of time; and recommend, as a recommendation to a prospective user one of the at least two contained spaces for the prospective user to select as a destination within the future period of time based on the prediction of the future number of the one or more objects of interest in each of the at least two contained spaces.

Aspect 2. The non-transitory computer readable medium of Aspect 1, wherein the instructions, when executed by the one or more processors, further cause the one or more processors to: utilize a vision detection sub-system to analyze the image of each of the at least two contained spaces, wherein each respective image is a frame from a respective real-time video feed of at least two contained spaces; based on the analysis of the image, detect one or more objects by the vision detection sub-system within the at least two contained spaces; and classify at least one or more of the one or more objects in the at least two contained spaces by the vision detection sub-system as the one or more objects of interest.

Aspect 3. The non-transitory computer readable medium of Aspect 2, wherein the instructions, when executed by the one or more processors, further cause the one or more processors to: utilize a computer vision sub-system detect a monitored number of objects in the at least two contained spaces; and responsive to the monitored number of objects, utilize the computer vision sub-system to generate the respective real-time video feed.

Aspect 4. The non-transitory computer readable medium of any of Aspect 1 to Aspect 2, wherein the at least two contained spaces each comprise a physical building location of a first vendor or a drive-through location of a second vendor.

Aspect 5. The non-transitory computer readable medium of Aspect 4, wherein the first vendor is of a type selected from the group consisting of a bank, a restaurant, a health service provider, or a parking lot service provider, and the second vendor is the same type as the first vendor.

Aspect 6. The non-transitory computer readable medium of Aspect 4, wherein the first vendor is a bank, the second vendor is the bank, each physical building location is a bank lobby of a branch of the bank, and each drive-through location is a drive-through lane associated with the bank.

Aspect 7. The non-transitory computer readable medium of any of Aspect 1 to Aspect 6, wherein the instructions, when executed by the one or more processors, further cause the one or more processors to: generate a minimum wait time at each of the at least two contained spaces; and recommend as the recommendation to the prospective user the one of the at least two contained spaces for the prospective user to select as the destination within the future period of time further based on the minimum wait time at each of the at least two contained spaces.

Aspect 8. The non-transitory computer readable medium of any of Aspect 1 to Aspect 7, wherein the instructions, when executed by the one or more processors, further cause the one or more processors to: generate, via a location module, a distance of each of the at least two contained spaces to a location of the prospective user; and recommend as the recommendation to the prospective user the one of the at least two contained spaces for the prospective user to select as the destination within the future period of time further based on the distance of each of the at least two contained spaces to the location of the prospective user.

Aspect 9. The non-transitory computer readable medium of any of Aspect 1 to Aspect 8, wherein the instructions, when executed by the one or more processors, further cause the one or more processors to: determine, via a location module, an amount of traffic along a respective route to each of the at least two contained spaces from a location of the prospective user; generate, via the location module, a travel time prediction along each respective route based on the amount of traffic along each respective route; and recommend as the recommendation to the prospective user the one of the at least two contained spaces for the prospective user to select as the destination within the future period of time further based on the travel time prediction along each respective route to each of the at least two contained spaces.

Aspect 10. The non-transitory computer readable medium of any of Aspect 1 to Aspect 9, wherein the instructions, when executed by the one or more processors, further cause the one or more processors to: transmit the recommendation to a graphical user interface of a user mobile device of the prospective user; and display the recommendation on the graphical user interface of the user mobile device.

Aspect 11. The non-transitory computer readable medium of any of Aspect 1 to Aspect 10, wherein the one or more objects of interest of a respective space are a proper subset of all individuals within a respective contained space.

Aspect 12. The non-transitory computer readable medium of Aspect 11, wherein the at least two contained spaces are each associated with a resource.

Aspect 13. The non-transitory computer readable medium of Aspect 11, wherein a set of excluded individuals are contained within all individuals within the respective contained space but are not present in the objects of interest.

Aspect 14. The non-transitory computer readable medium of any of Aspect 1 to Aspect 10, wherein the one or more objects of interest are one or more vehicles.

Aspect 15. The non-transitory computer readable medium of Aspect 14, wherein the at least two contained spaces each comprise at least a drive-through location of a physical vendor.

Aspect 16. The non-transitory computer readable medium of Aspect 15, wherein the physical vendor comprises one of a bank, a restaurant, or a health service provider.

Aspect 17. The non-transitory computer readable medium of any of Aspect 1 to Aspect 16, wherein the instructions, when executed by the one or more processors, further cause the one or more processors to: generate, via the time-series-based prediction model, a prediction of a second future number of the one or more objects of interest in the at least two contained spaces within a second future period of time after the future period of time; and generate a second recommendation to the prospective user to not select the recommendation and to wait until the second future period of time after the future period of time when the prediction of the second future number of the one or more objects of interest in the at least two contained spaces is less than the prediction of the future number of the one or more objects of interest in each of the at least two contained spaces.

Aspect 18. The non-transitory computer readable medium of any of Aspect 1 to Aspect 17, wherein the future period of time is a pre-determined period of time directly after the period of time or a selected period of time after the period of time with a time interval therebetween.

Aspect 19. An AI prediction system comprising one or more processors and memory having instructions. When executed by the one or more processors, the instructions cause the one or more processors to perform any of the features of Aspect 1 to Aspect 18.

Aspect 20. A method for utilizing an AI prediction system, the method comprising performing any of the features of Aspect 1 to Aspect 18.

What is claimed is:

1. A non-transitory computer readable medium having instructions that, when executed by one or more processors, cause the one or more processors to:

convert one or more objects of interest from a respective image of each of at least two contained spaces into respective one or more numerical counts indicative of a number of the one or more objects of interest in the at least two contained spaces within a period of time;

generate, via a time-series-based prediction model, a prediction of a future number of the one or more objects of interest in the at least two contained spaces within a future period of time after the period of time;

recommend, as a recommendation to a prospective user one of the at least two contained spaces for the prospective user to select as a destination within the future period of time based on the prediction of the future number of the one or more objects of interest in each of the at least two contained spaces;

generate, via the time-series-based prediction model, a prediction of a second future number of the one or more objects of interest in the at least two contained spaces within a second future period of time after the future period of time; and generate a second recommendation to the prospective user to not select the recommendation and to wait until the second future period of time after the future period of time when the prediction of the second future number of the one or more objects of interest in the at least two contained spaces is less than the prediction of the future number of the one or more objects of interest in each of the at least two contained spaces.

2. The non-transitory computer readable medium of claim 1, wherein the instructions, when executed by the one or more processors, further cause the one or more processors to:

utilize a vision detection sub-system to analyze the image of each of the at least two contained spaces, wherein each respective image is a frame from a respective real-time video feed of at least two contained spaces;

based on the analysis of the image, detect one or more objects by the vision detection sub-system within the at least two contained spaces; and classify at least one or more of the one or more objects in the at least two contained spaces by the vision detection sub-system as the one or more objects of interest.

3. The non-transitory computer readable medium of claim 2, wherein the instructions, when executed by the one or more processors, further cause the one or more processors to:

utilize a computer vision sub-system to detect a monitored number of objects of interest in the at least two contained spaces; and responsive to the monitored number of objects of interest, utilize the computer vision sub-system to generate the respective real-time video feed.

4. The non-transitory computer readable medium of claim 1, wherein the at least two contained spaces each comprise a physical building location of a first vendor or a drive-through location of a second vendor.

5. The non-transitory computer readable medium of claim 4, wherein the first vendor is of a type selected from the group consisting of a bank, a restaurant, a health service provider, or a parking lot service provider, and the second vendor is the same type as the first vendor.

6. The non-transitory computer readable medium of claim 4, wherein the first vendor is a bank, the second vendor is the bank, each physical building location is a bank lobby of a branch of the bank, and each drive-through location is a drive-through lane associated with the bank.

7. The non-transitory computer readable medium of claim 1, wherein the instructions, when executed by the one or more processors, further cause the one or more processors to:

generate a minimum wait time at each of the at least two contained spaces; and recommend as the recommendation to the prospective user the one of the at least two contained spaces for the prospective user to select as the destination within the future period of time further based on the minimum wait time at each of the at least two contained spaces.

8. The non-transitory computer readable medium of claim 1, wherein the instructions, when executed by the one or more processors, further cause the one or more processors to:

generate, via a location module, a distance of each of the at least two contained spaces to a location of the prospective user; and recommend as the recommendation to the prospective user the one of the at least two contained spaces for the prospective user to select as the destination within the future period of time further based on the distance of each of the at least two contained spaces to the location of the prospective user.

9. The non-transitory computer readable medium of claim 1, wherein the instructions, when executed by the one or more processors, further cause the one or more processors to:

determine, via a location module, an amount of traffic along a respective route to each of the at least two contained spaces from a location of the prospective user;

generate, via the location module, a travel time prediction along each respective route based on the amount of traffic along each respective route; and recommend as the recommendation to the prospective user the one of the at least two contained spaces for the prospective user to select as the destination within the future period of time further based on the travel time prediction along each respective route to each of the at least two contained spaces.

10. The non-transitory computer readable medium of claim 1, wherein the instructions, when executed by the one or more processors, further cause the one or more processors to:

transmit the recommendation to a graphical user interface of a user mobile device of the prospective user; and display the recommendation on the graphical user interface of the user mobile device.

11. The non-transitory computer readable medium of claim 1, wherein the one or more objects of interest of a respective space are a proper subset of all individuals within a respective contained space.

12. The non-transitory computer readable medium of claim 11, wherein the at least two contained spaces are each associated with a resource.

13. The non-transitory computer readable medium of claim 11, wherein a set of excluded individuals are contained within all individuals within the respective contained space but are not present in the one or more objects of interest.

14. The non-transitory computer readable medium of claim 1, wherein the one or more objects of interest are one or more vehicles.

15. The non-transitory computer readable medium of claim 14, wherein the at least two contained spaces each comprise at least a drive-through location of a physical vendor.

16. The non-transitory computer readable medium of claim 15, wherein the physical vendor comprises one of a bank, a restaurant, or a health service provider.

17. The non-transitory computer readable medium of claim 1, wherein the future period of time is a pre-determined period of time directly after the period of time or a selected period of time after the period of time with a time interval therebetween.

18. A system comprising:

one or more processors;

memory having instructions that, when executed by the one or more processors, cause the one or more processors to:

convert one or more objects of interest from a respective image of each of at least two contained spaces into respective one or more numerical counts indicative of a number of the one or more objects of interest in the at least two contained spaces within a period of time;

generate, via a time-series-based prediction model, a prediction of a future number of the one or more objects of interest in the at least two contained spaces within a future period of time after the period of time;

recommend as a recommendation to a prospective user one of the at least two contained spaces for the prospective user to select as a destination within the future period of time based on the prediction of the future number of the one or more objects of interest in each of the at least two contained spaces;

generate, via the time-series-based prediction model, a prediction of a second future number of the one or more objects of interest in the at least two contained spaces within a second future period of time after the future period of time; and generate a second recommendation to the prospective user to not select the recommendation and to wait until the second future period of time after the future period of time when the prediction of the second future number of the one or more objects of interest in the at least two contained spaces is less than the prediction of the future number of the one or more objects of interest in each of the at least two contained spaces.

19. A method, comprising:

converting one or more objects of interest from a respective image of each of at least two contained spaces into respective one or more numerical counts indicative of a number of the one or more objects of interest in the at least two contained spaces within a period of time;

generating, via a time-series-based prediction model, a prediction of a future number of the one or more objects of interest in the at least two contained spaces within a future period of time after the period of time;

recommending as a recommendation to a prospective user one of the at least two contained spaces for the prospective user to select as a destination within the future period of time based on the prediction of the future number of one or more objects of interest in each of the at least two contained spaces;

generating, via the time-series-based prediction model, a prediction of a second future number of the one or more objects of interest in the at least two contained spaces within a second future period of time after the future period of time; and generating a second recommendation to the prospective user to not select the recommendation and to wait until the second future period of time after the future period of time when the prediction of the second future number of the one or more objects of interest in the at least two contained spaces is less than the prediction of the future number of the one or more objects of interest in each of the at least two contained spaces.

20. The method of claim 19, further comprising:

utilizing a vision detection sub-system to analyze the image of each of the at least two contained spaces, wherein each respective image is a frame from a respective real-time video feed of at least two contained spaces;

based on the analysis of the image, detecting one or more objects by the vision detection sub-system within the at least two contained spaces; and classifying at least one or more of the one or more objects in the at least two contained spaces by the vision detection sub-system as the one or more objects of interest.

21. The method of claim 20, further comprising:

utilizing a computer vision sub-system to detect a monitored number of objects of interest in the at least two contained spaces; and responsive to the monitored number of objects of interest, utilizing the computer vision sub-system to generate the respective real-time video feed.

22. The method of claim 19, wherein the at least two contained spaces each comprise a physical building location of a first vendor or a drive-through location of a second vendor.

23. The method of claim 22, wherein the first vendor is of a type selected from the group consisting of a bank, a restaurant, a health service provider, or a parking lot service provider, and the second vendor is the same type as the first vendor.

24. The method of claim 22, wherein the first vendor is a bank, the second vendor is the bank, each physical building location is a bank lobby of a branch of the bank, and each drive-through location is a drive-through lane associated with the bank.

25. The method of claim 19, further comprising:

generating a minimum wait time at each of the at least two contained spaces; and recommending as the recommendation to the prospective user the one of the at least two contained spaces for the prospective user to select as the destination within the future period of time further based on the minimum wait time at each of the at least two contained spaces.

26. The method of claim 19, further comprising:

generating, via a location module, a distance of each of the at least two contained spaces to a location of the prospective user; and recommending as the recommendation to the prospective user the one of the at least two contained spaces for the prospective user to select as the destination within the future period of time further based on the distance of each of the at least two contained spaces to the location of the prospective user.

27. The method of claim 19, further comprising:

determining, via a location module, an amount of traffic along a respective route to each of the at least two contained spaces from a location of the prospective user;

generating, via the location module, a travel time prediction along each respective route based on the amount of traffic along each respective route; and recommending as the recommendation to the prospective user the one of the at least two contained spaces for the prospective user to select as the destination within the future period of time further based on the travel time prediction along each respective route to each of the at least two contained spaces.

28. The method of claim 19, further comprising:

transmitting the recommendation to a graphical user interface of a user mobile device of the prospective user; and displaying the recommendation on the graphical user interface of the user mobile device.

29. The method of claim 19, wherein the one or more objects of interest of a respective space are a proper subset of all individuals within a respective contained space.

30. The method of claim 29, wherein the at least two contained spaces are each associated with a resource.

31. The method of claim 29, wherein a set of excluded individuals are contained within all individuals within the respective contained space but are not present in the one or more objects of interest.

32. The method of claim 19, wherein the one or more objects of interest are one or more vehicles.

33. The method of claim 32, wherein the at least two contained spaces each comprise at least a drive-through location of a physical vendor.

34. The method of claim 33, wherein the physical vendor comprises one of a bank, a restaurant, or a health service provider.

35. The method of claim 19, wherein the future period of time is a pre-determined period of time directly after the period of time or a selected period of time after the period of time with a time interval therebetween.

* * * * *